(12) United States Patent
Stebbins et al.

(10) Patent No.: US 9,200,943 B2
(45) Date of Patent: Dec. 1, 2015

(54) ACOUSTIC SENSING SYSTEM FOR A MOTOR VEHICLE

(71) Applicant: GM Global Technology Operations LLC, Detroit, MI (US)

(72) Inventors: Mark A. Stebbins, Bloomfield Hills, MI (US); Joseph A. Schudt, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 322 days.

(21) Appl. No.: 13/943,980

(22) Filed: Jul. 17, 2013

(65) Prior Publication Data
US 2015/0020595 A1 Jan. 22, 2015

(51) Int. Cl.
*G01H 1/00* (2006.01)
*G01H 11/06* (2006.01)
*G10K 11/178* (2006.01)

(52) U.S. Cl.
CPC ............... *G01H 1/00* (2013.01); *G01H 11/06* (2013.01); *G10K 11/1788* (2013.01); *G10K 2210/1282* (2013.01); *G10K 2210/3226* (2013.01)

(58) Field of Classification Search
CPC ........... G01H 1/00; G01H 11/06; G01H 3/10; H04N 11/00; G01K 2210/1282; G01N 29/12
USPC .................. 73/658, 654, 340, 683, 646, 579; 381/56, 71.4
See application file for complete search history.

(56) References Cited

U.S. PATENT DOCUMENTS

| | | | |
|---|---|---|---|
| 8,122,866 B2* | 2/2012 | Fonville et al. | 123/195 C |
| 2009/0149999 A1* | 6/2009 | Schramm et al. | 700/280 |
| 2010/0082274 A1* | 4/2010 | Son et al. | 702/56 |
| 2012/0269358 A1* | 10/2012 | Gee et al. | 381/71.4 |

* cited by examiner

*Primary Examiner* — Lisa Caputo
*Assistant Examiner* — Nigel Plumb
(74) *Attorney, Agent, or Firm* — Cantor Colburn LLP

(57) ABSTRACT

An acoustic sensing system for a motor vehicle includes a strain gauge mounted at a motor vehicle surface, and a sensing circuit operatively coupled to the strain gauge. The sensing circuit is configured and disposed to detect acoustic responses in a passenger compartment of the motor vehicle through the strain gauge.

23 Claims, 2 Drawing Sheets

ACOUSTIC SENSING SYSTEM FOR A MOTOR VEHICLE

FIELD OF THE INVENTION

The subject invention relates to motor vehicles and, more particularly, to an acoustic sensing system for a motor vehicle.

BACKGROUND

Motor vehicles include a passenger compartment that provides seating for a driver and one or more passengers. While traveling, the motor vehicle may pass over road surface imperfections such as pot holes, bumps, debris and railroad or trolley tracks or other objects that cause a physical and an audible response. In addition to road induced noise, engine noise and audio system noise may also represent unwanted or undesirable audible responses. The audible response(s) may pass through the motor vehicle into the passenger compartment as unwanted noise. The unwanted noise may be both perceived and annoying to the driver and/or the one or more passengers. In order to reduce the unwanted noise from passing into the passenger compartment, motor vehicles include a suspension system.

The suspension system may include one or more of a shock absorber system, a spring system, torsion bars, and the like, that dampen both the physical and audible response. While reducing effects of passing over changes in road surface, an audible response may still be perceived in the passenger compartment. In some cases, the suspension system itself contributes to the audible response. Accordingly, it is desirable to provide a system that can reduce unwanted acoustics that may be present in the passenger compartment of a motor vehicle.

SUMMARY OF THE INVENTION

In accordance with an exemplary embodiment, a passenger compartment acoustic sensing system for a motor vehicle includes a strain gauge mounted at a motor vehicle surface, and a sensing circuit operatively coupled to the strain gauge. The sensing circuit is configured and disposed to detect acoustic responses in a passenger compartment of the motor vehicle through the strain gauge.

In accordance with another exemplary embodiment, a motor vehicle includes a body having at least one motor vehicle surface that defines, at least in part, a passenger compartment. A passenger compartment acoustic sensing system is operatively coupled to the body. The passenger compartment acoustic sensing system includes a strain gauge mounted at the at least one motor vehicle surface, and a sensing circuit operatively coupled to the strain gauge. The sensing circuit is configured and disposed to detect acoustic responses in a passenger compartment of the motor vehicle.

In accordance with yet another exemplary embodiment, a method of sensing an acoustic response in a passenger compartment of a motor vehicle includes passing an electrical current through a strain gauge mounted at a surface of the passenger compartment, receiving an acoustic response through the strain gauge, and detecting the acoustic response with a sensing circuit electrically connected to the strain gauge.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
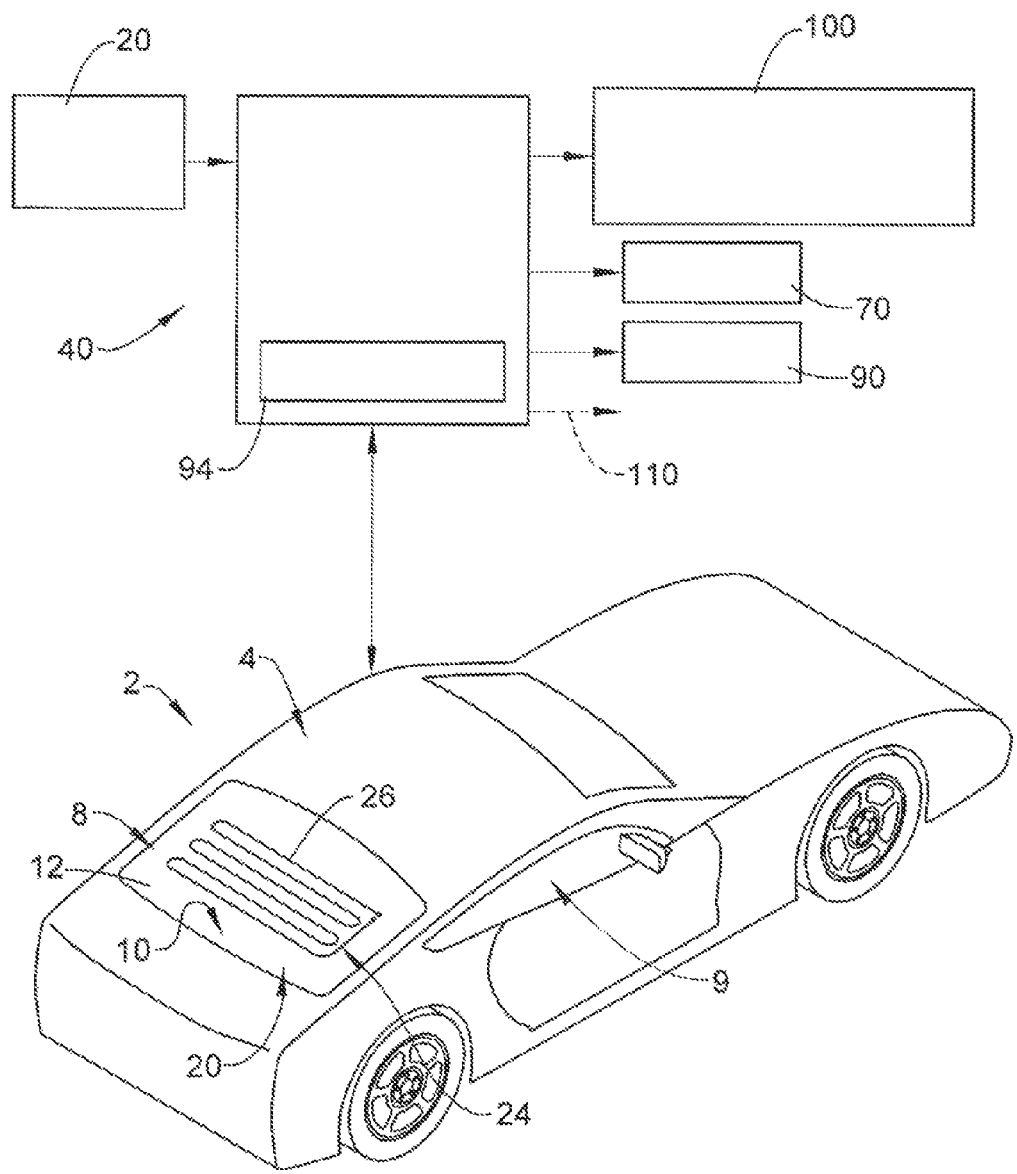
FIG. 1 is a schematic view of a motor vehicle including a passenger compartment acoustic sensing system in accordance with an exemplary embodiment.

The following description is merely exemplary in nature and is not intended to limit the present disclosure, its application or uses. It should be understood that throughout the drawings, corresponding reference numerals indicate like or corresponding parts and features. A motor vehicle, in accordance with an exemplary embodiment, is indicated generally at 2 in FIG. 1. Motor vehicle 2 includes a body 4 having a plurality of motor vehicle surfaces, indicated generally at 8 that define, at least in part, a passenger compartment 9. Motor vehicle surfaces 8 include at least one glass surface 10 that takes the form of a rear window 12 of motor vehicle 2. Rear window 12 includes a strain gauge 20 shown in the form of an electric resistive heater 24. Strain gauge 20 functions, in accordance with one aspect of the exemplary embodiment, as a rear window defroster 26. As will be detailed more fully below, strain gauge 20 also forms part of a passenger compartment acoustic sensing system 40 that detects sounds, such as road noise, engine noise, audio system noise and the like that may be perceived within passenger compartment 9.

Figure 2:
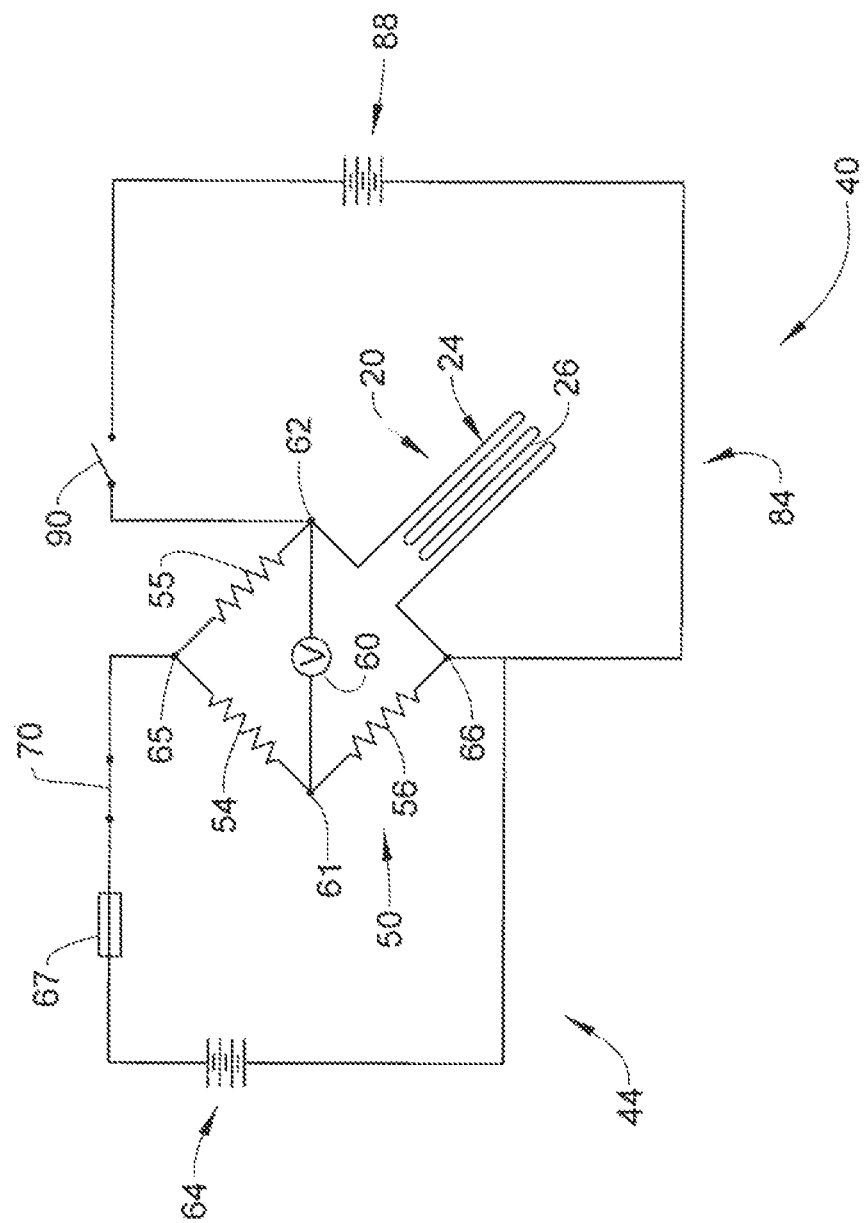
FIG. 2 is a schematic diagram illustrating the acoustic sensing system of FIG. 1.

In accordance with an exemplary embodiment, passenger compartment acoustic sensing system 40 includes a sensing circuit 44, FIG. 2, operatively connected to strain gauge 20. Sensing circuit 44 includes a resistor bridge 50 having a first resistor 54, a second resistor 55 and a third resistor 56. Strain gauge 20 defines a fourth resistor. A volt meter 60 is electrically connected between a first junction 61 joining first and third resistors 54 and 56 and a second junction 62 joining second resistor 55 and strain gauge 20. A voltage source 64 is connected between a third junction 65 joining first and second resistors 54 and 55 and a fourth junction 66 joining third resistor 56 and strain gauge 20. Sensing circuit 44 also includes a current limiting device 67 and a switch 70 electrically connected in series between voltage source 64 and third junction 65. Motor vehicle 2 also includes a defroster circuit 84 connected to strain gauge 20. Defroster circuit 84 includes a voltage source 88 connected between second junction 62 and fourth junction 66. Defroster circuit 84 also includes a switch 90. Voltage source 88 may be the same as voltage source 64 or may be a separate source of electrical input.

In further accordance with the exemplary embodiment, passenger compartment acoustic sensing system 40 includes a controller 94 operatively connected between strain gauge 20, switch 70 and switch 90. Controller 94 selectively closes switch 70 and opens switch 90 during acoustic sensing. In this manner, higher currents associated with operating in a defrosting mode are not passing through first, second and third resistors 54-56. When operating in an acoustic sensing mode, sounds transmitted through body 4 into passenger compartment 9 results in an acoustic response causing a change in resistance to strain gauge 20. The change in resistance is sensed by volt meter 60 and passed to controller 94. Controller 94 will signal an active acoustic cancellation system 100 to create and issue an acoustic cancellation signal, cancelling the sounds causing the acoustic response in strain gauge 20. In this manner, passenger compartment acoustic sensing system 40 enhances an overall driver and passenger experience with motor vehicle 2.

At this point it should be understood that the exemplary embodiments provide a system for detecting undesirable acoustic and/or passenger compartment structural responses in a passenger compartment of a motor vehicle. The system is described as employing a rear window defroster as a strain gauge for sensing acoustic responses. It should be understood however that a separate strain gauge could be provided in the motor vehicle on any one of a number of surfaces including both glass and non-glass motor vehicle surfaces. Further, the controller could be provided with an additional output, such as shown at 110 that could signal an external or remote monitoring system of a motor vehicle event causing, for example, a break, crack and/or shattering of the rear window. The external monitoring system may take action to address the motor vehicle event.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An acoustic sensing system for a motor vehicle comprising:
   a strain gauge mounted at a glass surface of the motor vehicle; and
   a sensing circuit operatively coupled to the strain gauge, the sensing circuit being configured and disposed to detect acoustic responses in a passenger compartment of the motor vehicle.

2. The acoustic sensing system for a motor vehicle according to claim 1, wherein the glass surface forms a rear window of the motor vehicle.

3. The acoustic sensing system for a motor vehicle according to claim 2, wherein the strain gauge comprises a rear window defroster.

4. The acoustic sensing system for a motor vehicle according to claim 1, wherein the strain gauge comprises an electric resistive heater.

5. The acoustic sensing system for a motor vehicle according to claim 4, further comprising: a defroster circuit operatively connected to the electric resistive heater.

6. The acoustic sensing system for a motor vehicle according to claim 5, further comprising: a controller operatively connected to the sensing circuit and the defroster circuit, the controller being configured and disposed to selectively electrically connect power to one of the sensing circuit and the defroster circuit and electrically isolate power from the other of the sensing circuit and the defroster circuit.

7. The acoustic sensing system according to claim 1, wherein the sensing circuit is configured and disposed to detect breakage of the glass surface.

8. The acoustic sensing system for a motor vehicle according to claim 1, further comprising: an active acoustic cancellation system operatively connected to the sensing circuit, the active acoustic cancellation system being configured and disposed to acoustically cancel the acoustic response in the passenger compartment.

9. A motor vehicle comprising:
   a body including at least one glass surface that defines, at least in part, a passenger compartment; and
   an acoustic sensing system operatively coupled to the body, the acoustic sensing system including:
   a strain gauge mounted to the at least one motor vehicle glass surface; and
   a sensing circuit operatively coupled to the strain gauge, the sensing circuit being configured and disposed to detect acoustic responses in a passenger compartment of the motor vehicle.

10. The motor vehicle according to claim 9, wherein the glass surface forms a rear window of the motor vehicle.

11. The motor vehicle according to claim 10, wherein the strain gauge comprises a rear window defroster.

12. The motor vehicle according to claim 9, wherein the strain gauge comprises an electric resistive heater.

13. The motor vehicle according to claim 12, further comprising: a defroster circuit operatively connected to the electric resistive heater.

14. The motor vehicle according to claim 13, further comprising: a controller operatively connected to the sensing circuit and the defroster circuit, the controller being configured and disposed to selectively electrically connect power to one of the sensing circuit and the defroster circuit and electrically isolate power from the other of the sensing circuit and the defroster circuit.

15. The motor vehicle according to claim 9, wherein the sensing circuit is configured and disposed to detect breakage of the glass surface.

16. The motor vehicle according to claim 9, further comprising: an active acoustic cancellation system operatively connected to the sensing circuit, the active acoustic cancellation system being configured and disposed to acoustically cancel the acoustic response in the passenger compartment.

17. A method of sensing an acoustic response in a passenger compartment of a motor vehicle, the method comprising:
   passing an electrical current through a strain gauge mounted at a glass surface of the passenger compartment;
   receiving an acoustic response through the strain gauge; and
   detecting the acoustic response with a sensing circuit electrically connected to the strain gauge.

18. The method of claim 17, wherein receiving the acoustic response through the strain gauge includes receiving an acoustic response through a rear window defroster mounted in the passenger compartment.

19. The method of claim 18, further comprising: selectively operating the strain gauge in one of an acoustic sensing mode and a defrosting mode.

20. The method of claim 17, further comprising: actively cancelling the acoustic response sensed through the strain gauge.

21. The method of claim 17, wherein receiving the acoustic response through the strain gauge includes receiving an acoustic response through a glass surface of the motor vehicle.

22. The method of claim 21, further comprising: detecting breakage of the glass surface.

23. The method of claim 22, further comprising: signaling breakage of the glass surface to a remote monitoring system.

* * * * *